US012311708B1

(12) United States Patent
Liu

(10) Patent No.: US 12,311,708 B1
(45) Date of Patent: May 27, 2025

(54) PULLEY FASTENER FOR CONNECTING WITH TRAILER SHACKLES

(71) Applicant: Qingdao Mihong Machinery Co., Ltd., Shandong (CN)

(72) Inventor: Yadan Liu, Shandong (CN)

(73) Assignee: Qingdao Mihong Machinery Co., Ltd., Qingdao (CN)

( * ) Notice: Subject to any disclaimer, the term of this patent is extended or adjusted under 35 U.S.C. 154(b) by 0 days.

(21) Appl. No.: 19/006,059

(22) Filed: Dec. 30, 2024

(30) Foreign Application Priority Data

Dec. 4, 2024 (CN) ......................... 202422983505.6

(51) Int. Cl.
*B60D 1/02* (2006.01)

(52) U.S. Cl.
CPC ..................................... *B60D 1/02* (2013.01)

(58) Field of Classification Search
CPC ................................. B60D 1/02; F16G 15/06
See application file for complete search history.

(56) References Cited

U.S. PATENT DOCUMENTS

| | | | | |
|---|---|---|---|---|
| 1,164,919 A * | 12/1915 | Carlson et al. | B66D 3/046 254/405 |
| 3,199,841 A * | 8/1965 | McKean | B66D 3/046 254/405 |
| 3,224,185 A * | 12/1965 | Grim | F16G 15/06 294/82.11 |
| 11,787,244 B1 * | 10/2023 | Tao | B60D 1/04 280/507 |
| D1,050,874 S * | 11/2024 | Schmidt | D12/162 |
| 2017/0089382 A1 * | 3/2017 | VerBrugge | F16B 21/186 |

FOREIGN PATENT DOCUMENTS

| | | | |
|---|---|---|---|
| CN | 216038245 U * | 3/2022 | |
| JP | 2003254317 A * | 9/2003 | |
| WO | WO-2014196832 A1 * | 12/2014 | F16G 15/06 |

OTHER PUBLICATIONS

"D Ring Split Shackle with Snatch Block, ¾41 Split Shackles w/Snatch Block Pulley, Heavy Duty Shackle for Towing Winch, Pulley for Off-Road Vehicle Recovery, Truck, ATV, UTV, BlackRed" as retrieved from the following Amazon link on Dec. 20, 2024. Date First Available: Nov. 25, 2024. The inventor(s) is directly responsible for this public disclosure. https://www.amazon.com/dp/BODCNRKJCQ?th=1.

* cited by examiner

*Primary Examiner* — Jacob D Knutson
(74) *Attorney, Agent, or Firm* — Nicholas Makridakis

(57) ABSTRACT

A pulley fastener for connecting with trailer shackles is provided, including a bolt. A pulley body is provided on an outside surface of the bolt, a first split shackle and a second split shackle are rotatably connected to the outside surface of the bolt and located on both sides of the pulley body, respectively. Both ends of the bolt are screwed with nuts for fixing the first split shackle and the second split shackle. By fastening the first and second split shackles, a closed structure and a semi open structure can be formed, which can facilitates the threading and fixing of ropes. The pulley body can provide higher traction efficiency and a safer operating environment by being compatible and cooperated with any shackles. And the multi angle adjustment function of the pulley body can reduce equipment damage caused by stress concentration, thereby enhancing the smoothness of the traction process.

5 Claims, 4 Drawing Sheets

2
1
5
3
4

PULLEY FASTENER FOR CONNECTING WITH TRAILER SHACKLES

CROSS REFERENCE TO RELATED APPLICATION

This application claims priority to Chinese Patent Application No. 2024229835056, filed on Dec. 4, 2024, which is hereby incorporated by reference in its entirety.

TECHNICAL FIELD

The present application relates to the technical field of traction and rescue equipments, and in particular to a pulley fastener for connecting with trailer shackles.

BACKGROUND

Shackles are generally used as connecting devices in mechanical engineering. Common shackles in the mechanical engineering include European large bow shackles, European DEE shackles, round headed shackles, square headed shackles, D-shaped shackles, and many other forms.

In current trailer and rescue operations, due to limited traction angles, stress concentration often occurs, increasing the risk of equipment damage and also reducing traction stability. Although traditional pulleys and shackles play their respective roles, their coordination efficiency is low in complex operations and the installation and adjustment process is cumbersome.

Therefore, it is necessary to provide a pulley fastener that can be used with trailer shackles to solve the above technical problems.

SUMMARY

The present disclosure aims to provide a pulley fastener for connecting with trailer shackles to address problems of low efficiency in their cooperation, cumbersome installation and adjustment processes during complex operations.

To achieve above objectives, the present disclosure adopts the following technical solutions.

In some embodiments of the present disclosure, a pulley fastener for connecting with trailer shackles is provided, including a bolt. Herein a pulley body is provided on an outside surface of the bolt, a first split shackle and a second split shackle are rotatably connected to the outside surface of the bolt and located on both sides of the pulley body, respectively. Both ends of the bolt are screwed with nuts for fixing the first split shackle and the second split shackle, and the first split shackle and the second split shackle form a closed loop.

Preferably, the first split shackle and the second split shackle each is provided with an interlock block and a location notch, the interlock block on the first split shackle is aligned with the location notch on the second split shackle, and the interlock block on the second split shackle is aligned with the location notch on the first split shackle.

Preferably, the first split shackle and the second split shackle each is provided with a magnetic sheet.

Preferably, the first split shackle is provided with a location pin, the second split shackle is provided with a limit structure. The limit structure includes a shell, one end of a slide block is inserted into an interior of the shell, another end of the slide block is fixed to the first slip shackle by means of a location sleeve, and a compression spring is provided between an inner wall of the shell and the slide block located in the shell.

Preferably, the location sleeve is engaged with the location pin, and the location sleeve is sleeved on the location pin to fix between the first split shackle and the second split shackle.

Preferably, the slide block located in the shell is fixedly connected with one end of a pull rod, and another end of the pull rod runs through the shell and extends to an exterior of the shell.

Compared with related technologies, the pulley fastener for connecting with trailer shackles of the present disclosure has at least the following beneficial effects and advantages.

The pulley fastener for connecting with trailer shackles of the present disclosure, by fastening the first and second split shackles, a closed structure and a semi open structure can be formed, which can facilitates the threading and fixing of ropes. Moreover, the pulley body provides higher traction efficiency and a safer operating environment by being compatible and cooperated with the first and second split shackles, regular shackles, or other similar shackles. In addition, the multi angle adjustment function of the pulley body can reduce equipment damage caused by stress concentration, thereby enhancing the smoothness of the traction process. Therefore, the pulley fastener has a simple design with high adaptability and flexibility, due to its compatibility with multiple types of shackles, it is particularly suitable for use in complex rescue and traction tasks, thereby effectively dispersing pull, improving operational efficiency, and also ensuring safety during the operation process.

Figure 1:
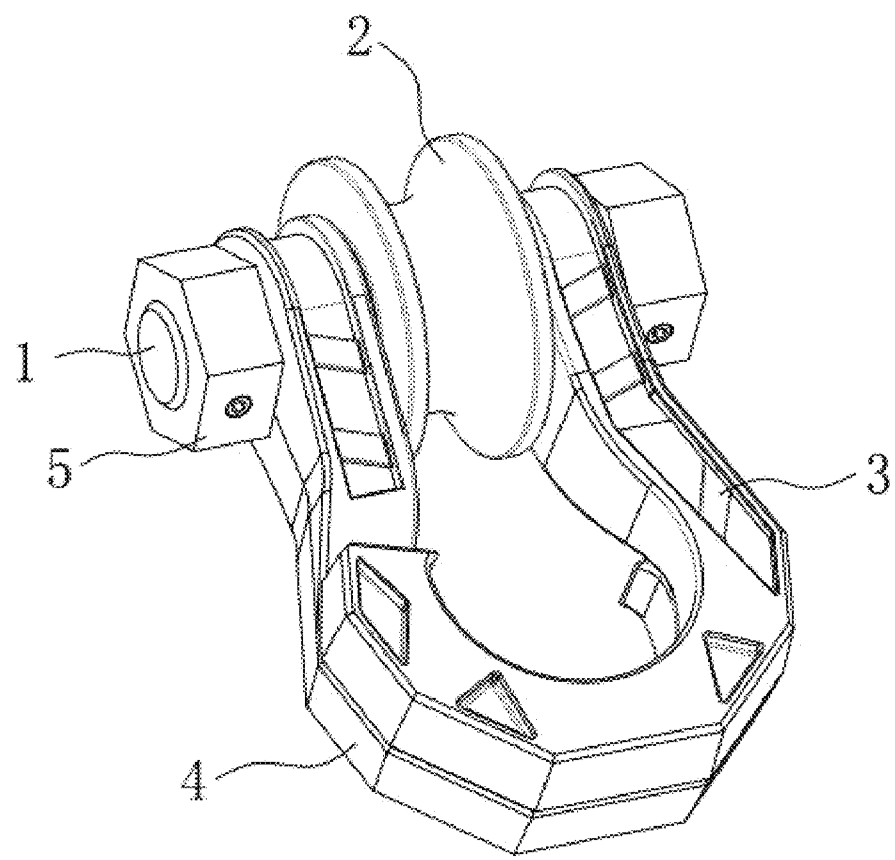
FIG. 1 shows a structural schematic diagram of a pulley fastener for connecting with trailer shackles in accordance with some embodiments of the present disclosure.

In the drawings, reference signs are as follows. 1. Bolt, 2. Pulley body, 3. First split shackle, 4. Second split shackle, 5. Nut, 6. Interlock block, 7. Location notch, 8. Magnetic sheet, 9. Limit structure, 91. Shell, 92. Slide block, 93. Compression spring, 94. Location sleeve, 95. Pull rod, 10. Location pin.

DETAILED DESCRIPTION OF THE EMBODIMENTS

The present disclosure will be further described in conjunction with the accompanying drawings and embodiments below.

Figure 2:
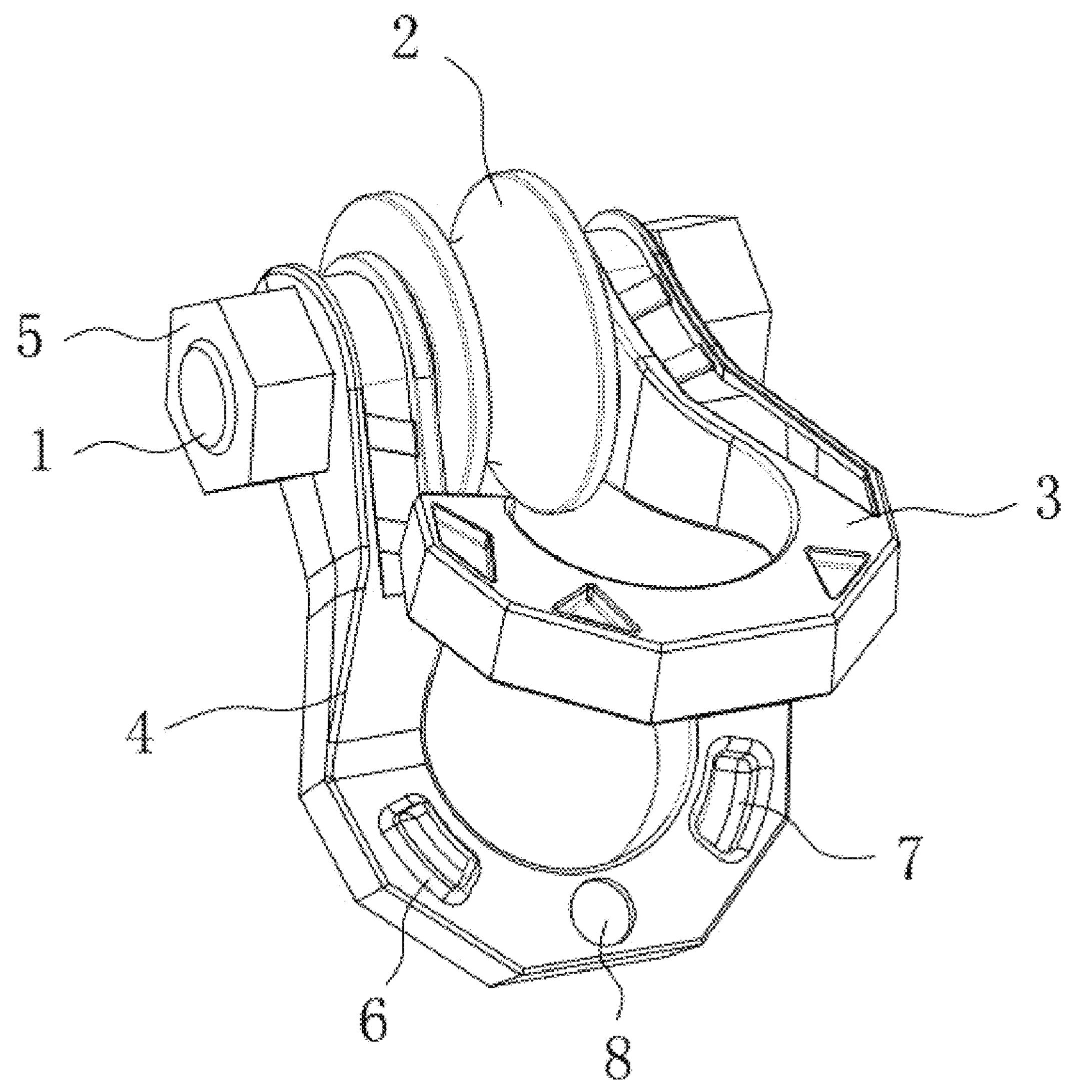
FIG. 2 shows a schematic diagram of a first split shackle and a second split shackle being opened in FIG. 1.
Figure 3:
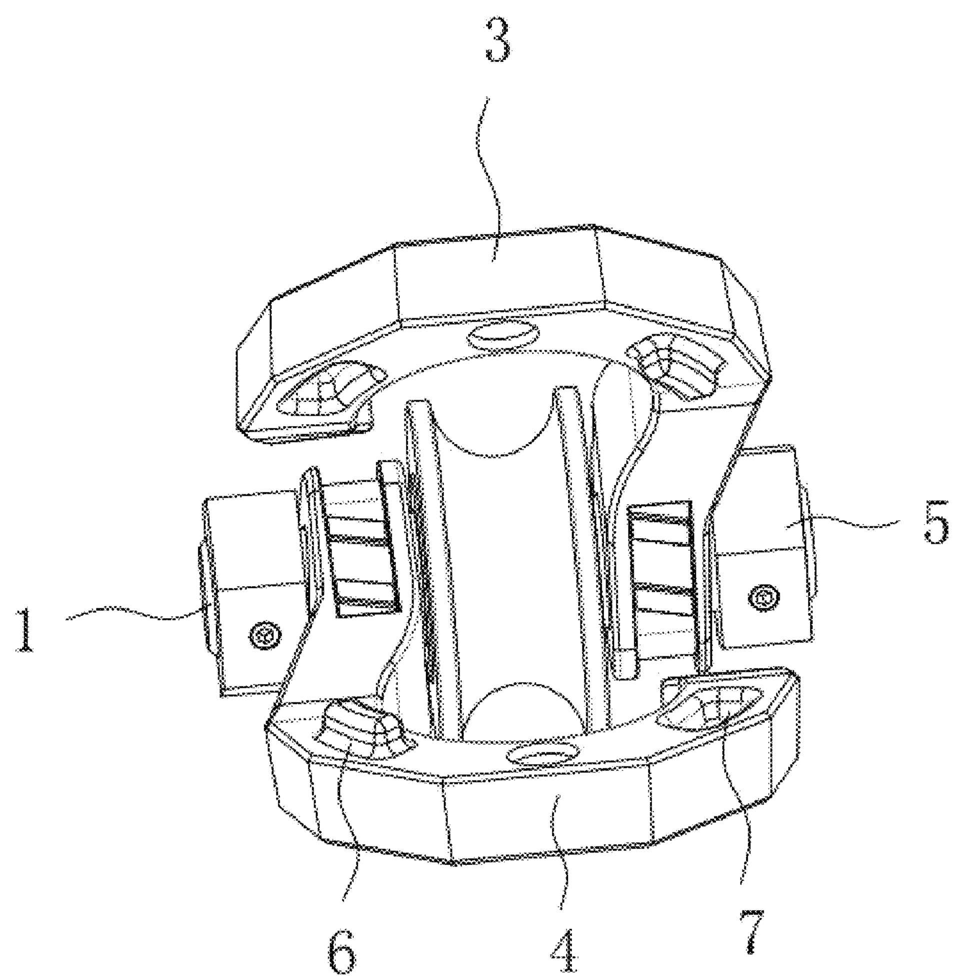
FIG. 3 shows a bottom view of the first split shackle in FIG. 2.

Referring to FIG. 1, FIG. 2, and FIG. 3, in which FIG. 1 shows a structural schematic diagram of a pulley fastener for connecting with trailer shackles in accordance with some embodiments of the present disclosure, FIG. 2 shows a schematic diagram of a first split shackle and a second split shackle being opened in FIG. 1, and FIG. 3 shows a bottom view of the first split shackle in FIG. 2. In some embodiments of the present disclosure, the pulley fastener for connecting with trailer shackles includes a bolt 1.

Herein a pulley body 2 is provided on an outside surface of the bolt 1, a first split shackle 3 and a second split shackle 4 are rotatably connected to the outside surface of the bolt 1 and also located on both sides of the pulley body 2, respectively. Both ends of the bolt 1 are screwed with nuts 5 for fixing the first split shackle 3 and the second split shackle 4, and the first split shackle 3 and the second split shackle 4 form a closed loop.

The pulley body 2 is made of high-strength materials with excellent wear resistance and high load bearing capacity, capable of withstanding traction forces of up to tens of tons. The structural design of the pulley body 2 has the function of multi angle free rotation, allowing it to flexibly adjust the traction angle as needed during rescue and traction operations, avoiding stress concentration problems caused by single direction traction.

The system of the pulley body 2 is specially designed to be compatible with different types of shackles. Users can not only choose split shackles, but also use ordinary shackles or other connection devices with similar functions, making the system widely applicable in different scenarios. In addition, the design of the pulley body 2 not only can simplify the connection process with the shackle, but also can support quick assembly and disassembly, thereby greatly improving the efficiency of rescue and traction operations.

The first split shackle 3 and the second split shackle 4 each is provided with an interlock block 6 and a location notch 7, the interlock block 6 on the first split shackle 3 is aligned with the location notch 7 on the second split shackle 4, and the interlock block 6 on the second split shackle 4 is aligned with the location notch 7 on the first split shackle 3.

The first split shackle 3 and the second split shackle 4 each is provided with a magnetic sheet 8.

By setting the magnetic sheet 8, the first split shackle 3 and the second split shackle 4 can be attracted together when they are fastened, improving the stability of use.

Operating principles of the pulley fastener for connecting with trailer shackles of the present disclosure will be described in detail as follows.

Flip the first split shackle 3 upwards to separate it from the second split shackle 4, allowing the closed loop between them being opened. Then, thread a rope through the opening of the second split shackle 4, placing it in the middle area between the first and second split shackles 3, 4. Finally, fasten the first split shackle 3 onto the second split shackle 4, forming the closed loop between them to secure the rope in place.

Compared with related technologies, the pulley fastener for connecting with trailer shackles of the present disclosure has at least the following beneficial effects and advantages.

The pulley fastener for connecting with trailer shackles of the present disclosure, by fastening the first and second split shackles 3, 4, a closed structure and a semi open structure can be formed, which can facilitates the threading and fixing of ropes. Moreover, the pulley body 2 provides higher traction efficiency and a safer operating environment by being compatible and cooperated with the first and second split shackles, regular shackles, or other similar shackles. In addition, the multi angle adjustment function of the pulley body 2 can reduce equipment damage caused by stress concentration, thereby enhancing the smoothness of the traction process. Therefore, the pulley fastener has a simple design with high adaptability and flexibility, due to its compatibility with multiple types of shackles, it is particularly suitable for use in complex rescue and traction tasks, thereby effectively dispersing pull, improving operational efficiency, and also ensuring safety during the operation process.

Figure 4:
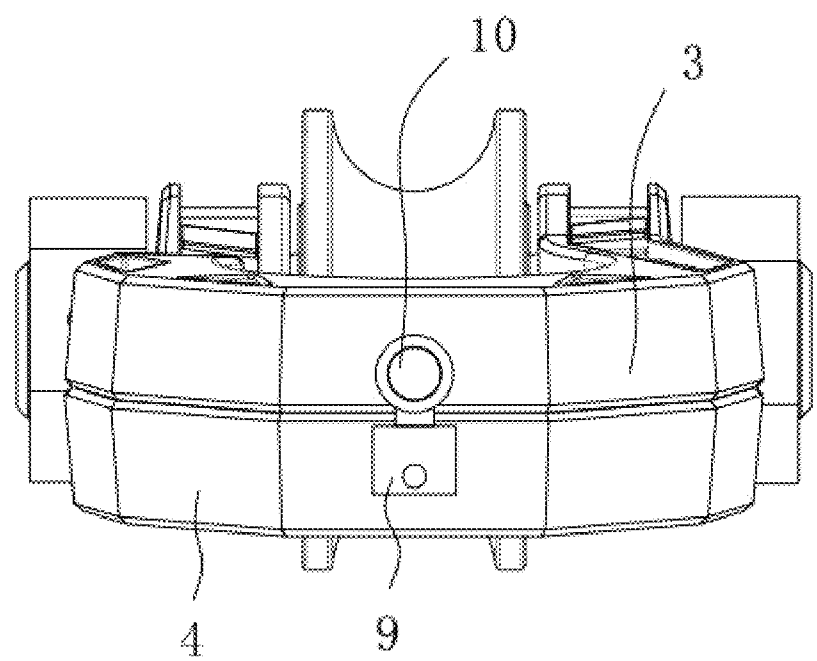
FIG. 4 shows another structural schematic diagram of the pulley fastener for connecting with trailer shackles in accordance with some embodiments of the present disclosure.
Figure 5:
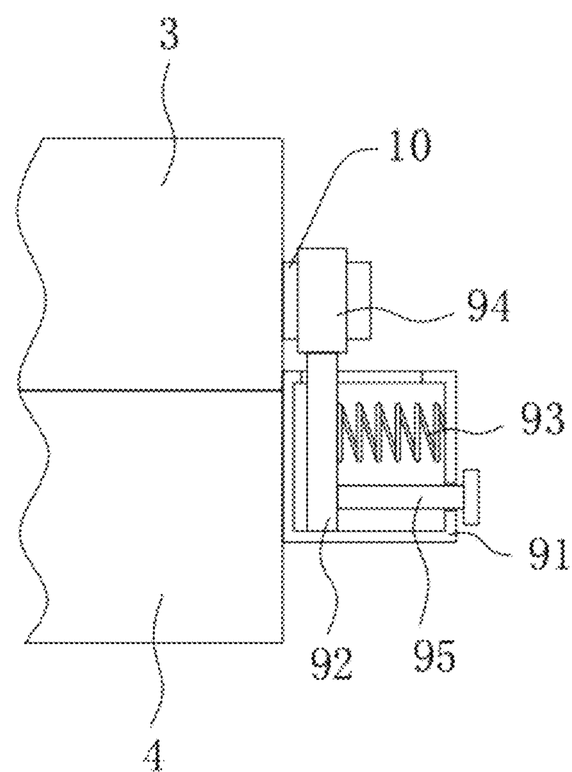
FIG. 5 shows a structural schematic diagram of a limit structure in FIG. 4.

Referring to FIG. 4 and FIG. 5, in some other preferred embodiments of the present disclosure, a pulley fastener for connecting with trailer shackles is provided.

Specifically, in addition to the above description of the structure of the pulley fastener for connecting with trailer shackles of the present disclosure, the first split shackle 3 is further provided with a location pin 10, the second split shackle 4 is further provided with a limit structure 9. The limit structure 9 includes a shell 91, one end of a slide block 92 is inserted into an interior of the shell 1, another end of the slide block 92 is fixed to the first slip shackle 3 by means of a location sleeve 94, and a compression spring 93 is provided between an inner wall of the shell 91 and the slide block 92 located in the shell 1.

The location sleeve 94 is engaged with the location pin 10, and the location sleeve 94 is sleeved on the location pin 10 to fix the first split shackle 3 and the second split shackle 4.

The slide block 92 located in the shell is fixedly connected with one end of a pull rod 95, and another end of the pull rod 95 runs through the shell 91 and extends to an exterior of the shell 91.

Compared with related technologies, the pulley fastener for connecting with trailer shackles of the present disclosure has at least the following beneficial effects and advantages.

When fastening the first split shackle 3 and the second split shackle 4, manually pull the pull rod 95 to move the slide block 92 and compress the compression spring 93. At this time, the location sleeve 94 will move outward. When the first and second split shackles 3, 4 are fastened, release the pull rod 95, and the compression spring 93 will rebound and reset, causing the slide block 92 to slide and reset. This causes the location sleeve 94 to move inward and be sleeved onto the location pin 10, thereby fixing the first and second split shackles 3, 4 and preventing them from being opened arbitrarily. In this way, it can improve the stability of use and also avoid the situation of detachment during use.

The above descriptions are only some embodiments of the present disclosure and do not intend to limit the patent scope of the present invention. Any equivalent structure or equivalent process transformation made using the content of the present specification and drawings, or directly or indirectly applied in other related technical fields, shall be included in the patent scope of the present invention.

What is claimed is:

1. A pulley fastener for connecting with trailer shackles, comprising a bolt;

wherein a pulley body is provided on an outside surface of the bolt, a first split shackle and a second split shackle are rotatably connected to the outside surface of the bolt and located on both sides of the pulley body, respectively;

wherein both ends of the bolt are screwed with nuts for fixing the first split shackle and the second split shackle;

wherein the first split shackle and the second split shackle form a closed loop; and wherein the first split shackle is provided with a location pin, the second split shackle is provided with a limit structure; and wherein the limit structure comprises a shell, one end of a slide block is inserted into an interior of the shell, another end of the slide block is fixed to the first slip shackle by means of a location sleeve, and a compression spring is provided between an inner wall of the shell and the slide block located in the shell.

2. The pulley fastener for connecting with trailer shackles according to claim 1, wherein the first split shackle and the second split shackle each is provided with an interlock block and a location notch, the interlock block on the first split shackle is aligned with the location notch on the second split shackle, and the interlock block on the second split shackle is aligned with the location notch on the first split shackle.

3. The pulley fastener for connecting with trailer shackles according to claim 1, wherein the first split shackle and the second split shackle each is provided with a magnetic sheet.

4. The pulley fastener for connecting with trailer shackles according to claim 1, wherein the location sleeve is engaged with the location pin and the location sleeve is sleeved on the location pin to fix the first split shackle and the second split shackle.

5. The pulley fastener for connecting with trailer shackles according to claim 1, wherein the slide block located in the shell is fixedly connected with one end of a pull rod, and another end of the pull rod runs through the shell and extends to an exterior of the shell.

* * * * *